Dec. 11, 1951    G. D. P. BRENT    2,578,627
APPARATUS FOR APPLYING A PRIMER COATING
TO THE STEMS OF FLASH LAMPS
Filed March 11, 1948                                      4 Sheets-Sheet 2

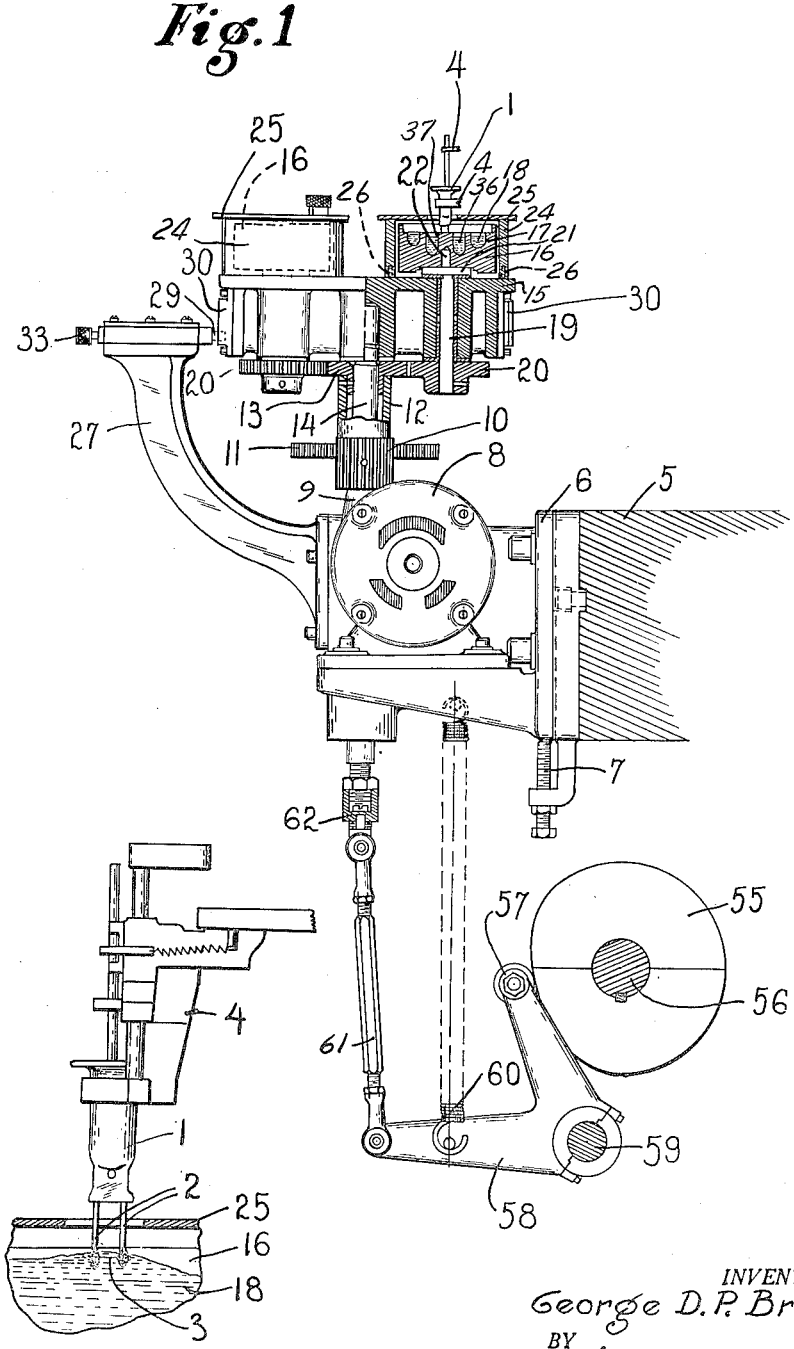

INVENTOR.
George D. P. Brent
BY
Lawrence Burns
ATTORNEY

Dec. 11, 1951  G. D. P. BRENT  2,578,627
APPARATUS FOR APPLYING A PRIMER COATING
TO THE STEMS OF FLASH LAMPS
Filed March 11, 1948  4 Sheets-Sheet 4
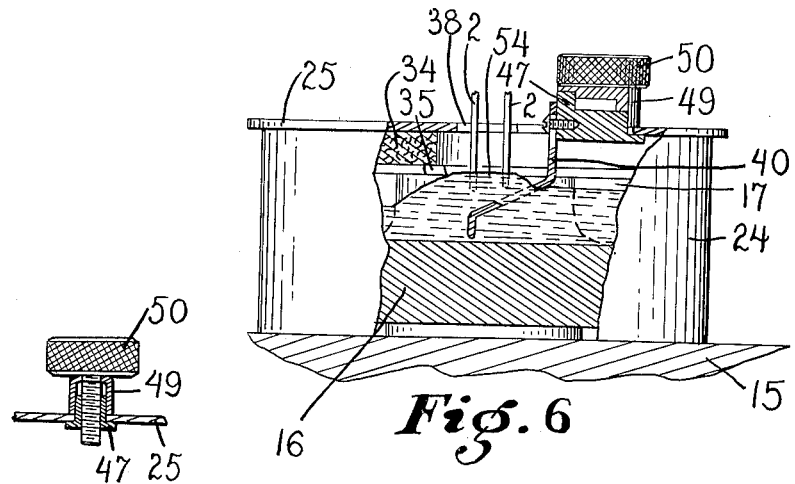
Fig. 6
Fig. 7
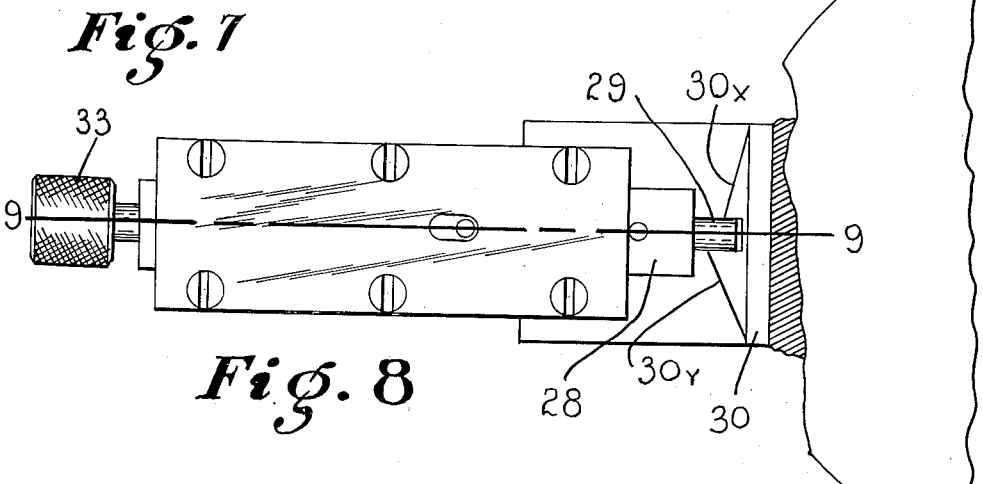
Fig. 8
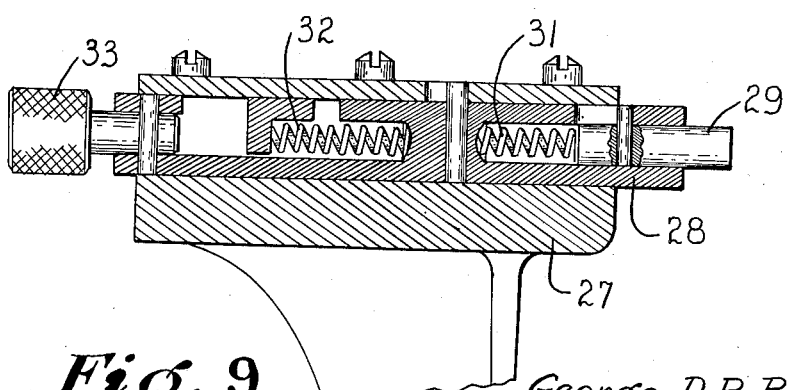
Fig. 9
INVENTOR.
George D. P. Brent
BY
Lawrence Burns,
ATTORNEY Patented Dec. 11, 1951

2,578,627

UNITED STATES PATENT OFFICE 2,578,627

APPARATUS FOR APPLYING A PRIMER COATING TO THE STEMS OF FLASH LAMPS

George D. P. Brent, Danvers, Mass., assignor to Sylvania Electric Products Inc., Salem, Mass., a corporation of Massachusetts Application March 11, 1948, Serial No. 14,236

10 Claims. (Cl. 91—46)

This invention relates to apparatus for coating flash lamp elements and particularly to such apparatus especially adapted for coating with chemically unstable or explosive material.

Desirably the invention is employed in connection with a lamp fabricating machine such as an automatic lamp stem making apparatus having a conveyor arranged to present a lamp stem to a position in line with the cup which contains the coating solution.

The coating mechanism is provided with an element which carries the coating material and which is moved substantially vertically. In its upper position the stems or the filament and a portion of the lead wires thereof are immersed in the coating material and in its lower position the mechanism moves away from the stem to permit the stems on the fabricating machine to index.

The coating applying mechanism is especially designed to insure safety inasmuch as the coating material used is zirconium which is extremely unstable chemically. Mechanical abrasion and shock tend to ignite the material when dry. Only a small quantity of the material is used at a time and it is placed in a cup member. The cup member is circular and provided with an annular groove within which the material is placed. The cup is rotated and provided with a fixed flow member element dipping into the material in such a manner that a wave of the material will pass across the fixed member. This wave will acquire a given depth determined by the viscosity of the material and the speed of rotation of the cup. Thus a predetermined depth of coating material is established at the flow member which, moreover, remains substantially constant independently of the general height of coating material in the cup. By dipping the lamp stems at the constant level point uniformity of the coating process is maintained.

Another feature of the invention is the provision of one or more additional cups for supplying coating material. This is accomplished in the embodiment illustrated by mounting the cups upon a rotatable turret member which is constructed to move the cups successively into operating position.

The cups are especially designed to prevent igniting the material as will be described in detail hereinafter.

It is an object of the invention to provide means for safely coating the filament and lead wires of a flash lamp with inflammable and chemically unstable material.

A further object of the invention is to provide such a coating means which applies a uniform coating to a succession of lamps.

A further object of the invention is to provide means for maintaining the coating material in a safely moist condition during the coating operation.

A further object of the invention is to provide a highly efficient coating mechanism having high durability and positive and precise operation.

To provide a better understanding of the invention a particular embodiment thereof will be described and illustrated in the drawings in which:

Fig. 1 is a general view of the mechanism embodying the invention shown partly in section.

Fig. 2 is detail view showing a lamp stem after it has been coated by the mechanism.

Fig. 6 is a partial section through the cup illustrating the flow of material in the cup at the dipping point.

Fig. 7 is a cross section taken on line 7—7 Fig. 3.

Fig. 8 is a plan view of the latching means for holding the cup turret in operating position.

Fig. 9 is a section on line 9—9 Fig. 8.

Figure 3:
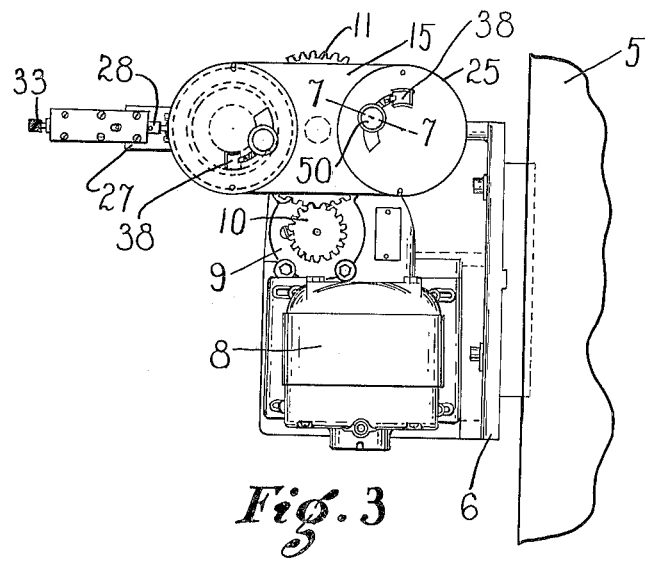
Fig. 3 is a plan view of the mechanism shown in Fig. 1.

The mechanism herewith described as embodying a desirable form of the invention is employed in connection with a machine for fabricating stem assemblies 1 having lead wires 2 and filaments 3. The stem assemblies 1 are held in conventional heads 4 in inverted position. A bracket 6, attached to a platen 5, is provided with means for vertical adjustment having an adjusting screw 7 to provide for accurate positioning of the cup for holding the coating material with respect to the stem to be coated.

The bracket 6 is provided with a shelf-like portion upon which is mounted an electric motor 8 for driving the mechanism. The motor is of the substantially constant speed type and is provided with a speed reducing means 9 the output shaft of which is provided with a pinion gear 10 which meshes with and drives a gear 11. The gear 11 is secured to a sleeve 12 which has secured to its upper end another gear 13. The hubs of the gears 11 and 13 are axially bored to receive a shaft 14 upon which they may rotate. The shaft 14 projects above the gear 13 and has secured thereto a turret member 15 which carries a pair of coating material holding cups 16. Two or more such cups may be provided.

The cups 16 are cylindrical in shape and are provided with an annular channel 17 within which the coating material 18 is received. The cups 16 are rotated during the operation of the device by means of vertical shafts 19 journalled in the turret 15. The lower end of the shafts each have secured thereto a gear 20 both of which mesh with the gear 13. The upper end of each shaft 19 has an enlarged flat head 21 and a small pilot shaft 22 which extends loosely into a central aperture in the cup. The weight of the cup rests on the head 21 and the cup is driven from the shaft by the friction of the head 21 with respect to the bottom of the cup. The frictional drive thus established develops sufficient torque to operate the cups under normal conditions. In the event that a mechanical defect in the cup driving mechanism develops tending to produce friction at some point in or near the cups the friction of the drive will be overcome and the cups will fail to rotate thereby preventing the generation of dangerous abrasion or frictional heat which might ignite the zirconium in the cup.

Another advantage of the friction drive resides in the manner in which it facilitates replacement of the cups upon the turret prior to placing them in dipping position. As will be described in detail hereinafter special means are provided to maintain the level of the coating material in the cup constant. For safety reasons this level should not be increased beyond its predetermined position because if it be raised, spilling of the material may occur which would create a fire hazard, and require suspension of operations until the cup is cleaned.

The drive shafts 19 are continuously driven so the cups must be placed in operation while the shafts rotate. If a positive mechanical clutching means were used to engage the cups the sudden starting of the cup would cause an abnormal accumulation of material at the dipping point. This abnormal condition would create a dangerous condition as above described. However the present invention permits the cup to be placed in position without causing an abnormal increase in the depth of the material since the frictional drive acts to bring the cup up to normal speed in a gradual manner.

Figure 4:
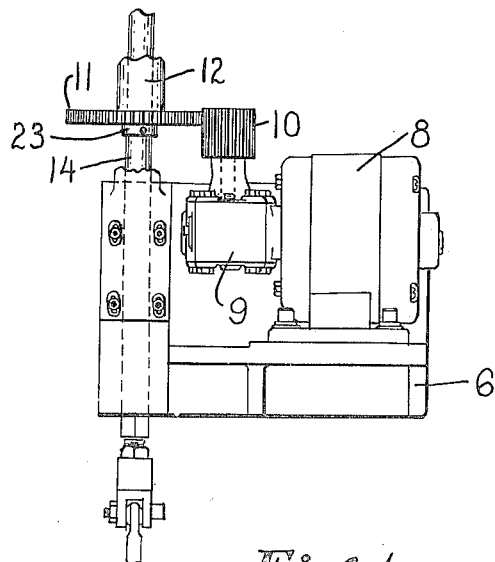
Fig. 4 is an elevational view of the mechanism looking toward the right in Fig. 1.

In the operation of the mechanism as will appear hereinafter, the shaft 14 is raised and lowered to perform the dipping operation. During this elevating movement the cups continue to rotate. The gears 11 and 13 being loosely mounted on the shaft are held against axial movement along the shaft by a collar 23 secured to the shaft below the gear 11 as shown in Fig. 4.

The cups are enclosed to prevent evaporation of the liquid in the zirconium mixture and as a precaution against the explosion and fire hazard involved. Desirably this is done by surrounding each cup with a cylindrical shield member 24 and a cover 25. The shield and cover act to confine the fumes of the nitrocellulose solvent and thereby retard its evaporation and also reduce the hazard of fire due to escaping fumes. The shield and its cover are held in place upon the turret 15 by means of positioning pins 26 fixed in the turret and projecting loosely into apertures 26a in the wall of the shield 24. The shield and its cover are thus rendered readily removeable and will blow upward in the event of an explosion without causing damage to the operator or the machine.

Because it is advisable for safety reasons to use only a small quantity of zirconium at a time the quantity must be replenished quite frequently for example at intervals of one hour of running time. Means are provided for doing this without inerruption of the operation of the stem machine to which the invention is applied. As above stated the turret is provided with two cups only one of which is in service at a time. Just prior to the time for renewing the supply of zirconium, a cup containing the new supply is placed in position on the opposite side of the turret from the cup that is in service.

To make the change the cup having the new supply is swung into operating position by rotating the turret on its shaft 14. The rotation of the turret is accomplished while the cups are in their down position. The turret is held in its operating positions by a latch device mounted on a bracket 27 which is rigidly secured to the main bracket 6.

The latch device is composed of a slide member 28 which is movable radially from the axis of the shaft 14 in a groove in the bracket 27. The slide is confined to the groove by a plate screwed in position across the top of the groove. The inner end of the slide has a spring actuated latch pin 29 which engages latch plates 30 upon the turret 15 to accurately position the turret in one or the other of its operating positions. The pin 29 is moveable within the slide 28 and normally is held in its outward position by a spring 31 and its outward position is determined by a stop pin anchored therein and moveable in a slot in the slide 28. The slide 28 itself is moveable in its guiding slot in the bracket 27. The movement of the slide is determined by a stop pin secured therein and having movement in a slot in the cover plate as shown in Figures 7 and 8 in the drawings. A spring 32 acts to urge the slide into its locking position. One end of the spring bearing against the bottom of an aperture in the slide and its other end bearing against an abutment projecting down from the cover plate. A knob 33 is fixed to the slide for manual operation thereof.

To effect the change from one cup to the other the operator releases the turret by withdrawing the slide to release the latch pin from the latch plate. The operator then grasps the turret and swings it 180° after releasing the slide 28.

When the turret approaches its new operating position the latch pin 29 is forced inward by an externally bevelled portion on the latch plate 30 until it enters the slot in the latch plate which accurately positions the inner cup in operating position.

Desirably special means are provided to prevent the turret from being rotated in the wrong direction when transfer of the cups is effected. The normal rotation is that of the gears 11 and 13 which is counterclockwise. If the turret were forced to rotate in clockwise direction the rotational speed of the cups would be increased beyond that of their operating speed which would cause spilling of the zirconium which in turn may result in work stoppage and the creation of fire hazard.

To prevent this the latch mechanism is specially constructed. The latch plates 30 are provided with two inclined faces 30X and 30Y. The face 30Y is longer than the face 30X. The apex of the face 30Y and the wall of the central pin slot extend farther away from the turret axis than the other apex of the latch plate.

The total movement of the slide 28 is determined by the movement of the stop pin anchored in the slide 28 and extending into the slot in the cover plate for the slide 28. This pin slot is just long enough to permit the slide to be manually retracted to clear the apex of the latch plate formed by the face 30X which permits the turret to swing in its intended counterclockwise direction. However this movement of the slide 28 fails to retract the latch pin 29 far enough to clear the apex of the latch plate at the face 30Y. Thus the turret cannot be released to be rotated in a clockwise direction.

After the turret has been released and swung into its next operating position the face 30Y strikes the pin 29 and is forced inward against the spring 32 to permit it to re-enter its slot.

The cup in which the zirconium has been exhausted must be immediately removed and carefully cleaned by a competent operator who knows the dangers involved in handling zirconium which may have become dry.

Special precautions are established to prevent the zirconium 18 in the channel 17 from drying out or changing its viscosity. A suitable means to do this is to provide a pad 34 of absorbent material desirably secured to the cover 25. The pad is saturated with the solvent used in mixing the zirconium such as a nitro cellulose solution and desirably is maintained in a saturated condition by means of a wick 35 which engages the pad 34 and dips into a quantity of solvent 36 in an inner annular channel 37 in the cup 25. In this manner the atmosphere inside the enclosure formed by the shield 24 and cover 25 is maintained at a substantially saturated vapor pressure sufficient to maintain the viscosity of the zirconium constant and prevent any portion of the liquid from drying out.

Special means to be described hereinafter are provided for maintaining the zirconium in the cup at a constant level at the dipping point. An aperture 38 is provided in cover 25 to permit the lamp stem 1 to enter the cup at the dipping point.

It is highly desirable that the lamp stem filament and leads be coated consistently to a predetermined height. This requires that the depth of liquid zirconium in the cup at the dipping point be held uniform. Safe and accurate performance of the mechanism in this respect is established by the present invention in a highly ingenious manner. An element which will be termed hereinafter a plow 40 is secured to the cover 25 and has a portion extending down into the cup groove 17. The plow 40 has an upper vertical portion 41, an angularly disposed central portion 42 and a bottom curved portion 43. The portion 42 of the plow has an aperture 44 therein through which the zirconium flows as will be described hereinafter.

Figure 5:
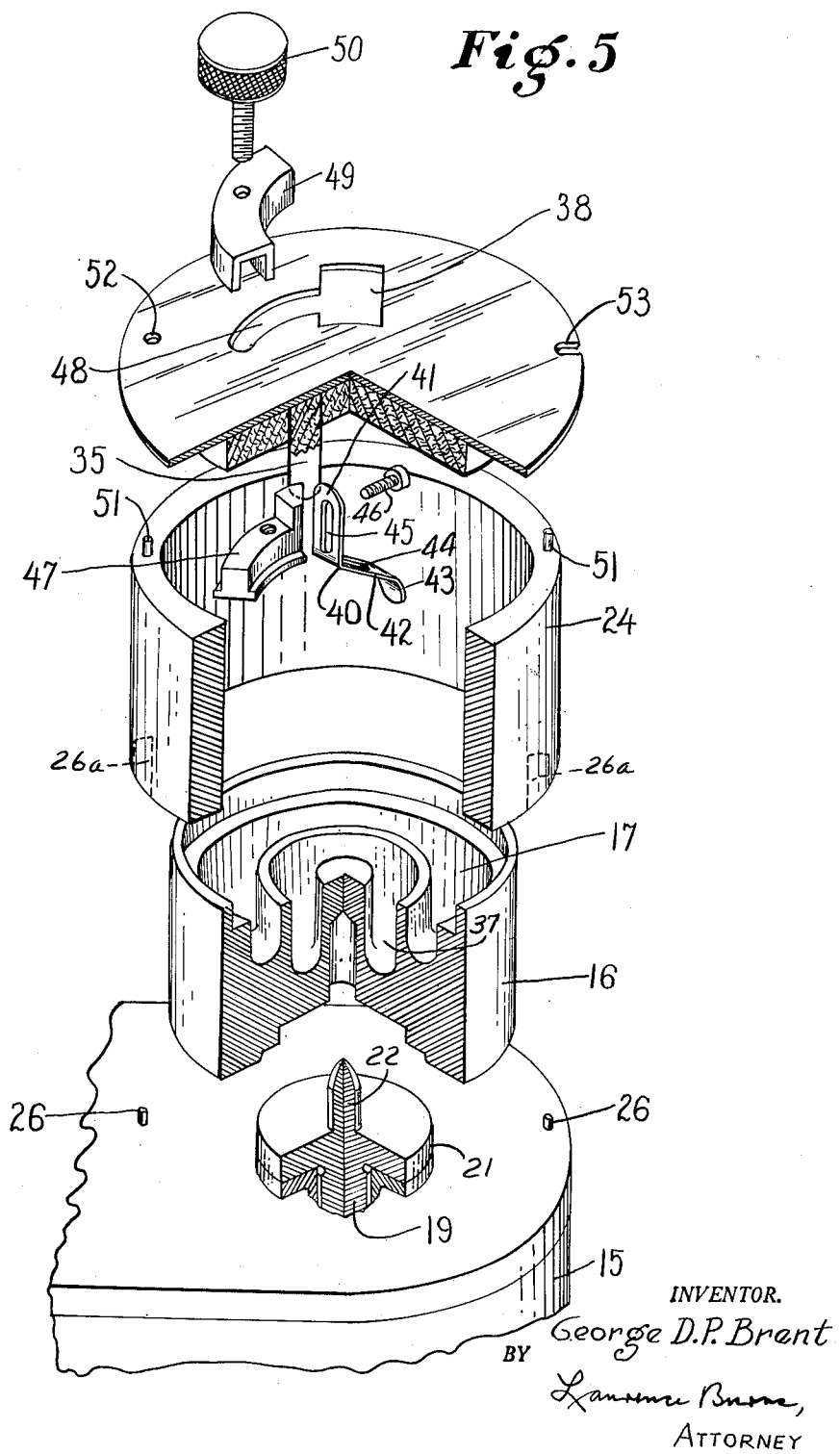
Fig. 5 is an exploded view illustrating the parts of the cup for holding the coating material.

The portion 41 is provided with a vertical slot 45 through which a screw 46 extends. The screw is received in a threaded aperture in the vertical face of a supporting member 47. The member 47 is shaped to fit into a slot 48 formed annularly in the cover 25 with respect to the axis of the cup. The bottom of the member 47 has flanges which engage the cover 25 at the marginal edges of the slot 48. The upper portion of the member 47 projects above top of the cover 25 and has a co-acting upper member 49 channel shaped in cross section fitting over the member 47 with its bottom edges engaging the top of the cover plate. A thumb screw 50 extends through an aperture in the member 49 and into a threaded aperture in the member 47. Thus it will be seen that by tightening the screw 50 the two members 47 and 49 are firmly clamped to the plate 25 thus rigidly supporting the plow 40. The slot 48 is longer than the member 47 thus providing for a limited amount of adjustment of the plow along the groove 17 in the cup. To insure freedom of adjustment the groove 48 is joined to the aperture 38. The member 49 is sufficiently long to extend over the aperture 48 at any adjusted position of the plow. In plan view the plow is shaped to conform to the contour of its groove and has a small clearance between its edges and the walls of the groove. This clearance between the plow and the walls of the groove is maintained by the special structure of the adjusting means for the plow and the accurate means for positioning the cover 25 upon the shield 24. This may be done in any desired manner such as by means of pins 51 fixed in the shield 24 and received in apertures in the cover 25. Desirably one of the pins 51 is received in an aperture 52 while the other pin is received in a slot 53 which closely fits the pin. The aperture 52 and slot 53 serve to accurately position the cover and also facilitate its installation and removal. Fig. 5 clearly illustrates the ease with which the cup and its associate parts are assembled and taken apart for cleaning or replacement and also the ease with which the plow may be adjusted with respect to the opening 38 in the cover 25.

In operation the cup is driven as described in the direction which causes the zirconium to flow against the lower face of the portion 42 and the bottom portion 43 of the plow as shown in Fig. 6 of the drawings. The zirconium is thus forced to flow through the aperture 44 and thence it flows along the top face of plow. This flow of zirconium forms what might be termed a wave 54 which is located at the dipping point where the filament and lead wires of the cups 16 and their driving mechanism are vertically moveable. This movement is obtained by raising and lowering the shaft 14 which is vertically guided in the bracket 6. The movement may be obtained in any desired manner. As shown this movement is obtained by a cam 55 which is secured to a cam shaft 56 which is driven in proper timed relation to the work cycle of the stem machine by means not shown. A cam roll 57 is mounted on a lever 58 which in turn is fulcrumed on a fulcrum shaft 59. The cam roll is held against the cam by a spring 60 secured at one end to the lever and at its other end to the bracket 6.

The horizontal arm of the lever 58 has pivotally connected to it a link 61 the other end of which is connected to the bottom of the shaft 14 by a swivel and pivot connection 62. The swivel permits the shaft to rotate when the turret is swung to present a cup in position for the dipping operation. As shown in Fig. 1 the cups are in their raised position at which time the filament and a portion of the lead wires of the stem 1 are immersed in the coating material. After a dwell during which the cup is rotating the cups are lowered to their bottom position at which time the cups move out of the path of the stems. The next stem on the stem machine conveyor is then moved into its coating position and the coating cycle is repeated.

Since there is relative axial movement between the gear 11 and the gear 10 when the cups are moved up and down, the gear 10 is made with a relatively wide face thus the two gears remain in mesh at all times.

The same relative movement takes place between the latch pin 29 and the latch plates 30. The latch plates 30 are therefore constructed to permit the necessary movement of the turret without interrupting the function of the latch.

It should be emphasized that the plow member 40 functions not only to maintain the depth of coating material constant at the dipping point but also to thoroughly agitate the material thereby to maintain a uniform viscosity throughout the material and an even distribution of the zirconium therein.

The above description has been directed to the coating of flash lamp stems for use in lamps of the type containing metallic foil or wire. Such stems have extremely fine wire filaments which are kept relatively free of coating material for reasons known in the art but which it is not necessary to set forth herein.

To prevent too great an accumulation of coating material on the filament the viscosity of the material is established at a known critical degree. The special means provided in the present invention for maintaining constant viscosity in the material is therefore a valuable feature of the invention. Such control helps to maintain the precise character of the operation of the device, and the high quality of the product.

The invention may also be applied to dipping the stems of the type of flash lamps not having foil or wire therein, in which case it is desirable to coat the filament with a relatively heavy coating. To do this the character of the coating material and its viscosity are adjusted to deposit a substantial amount on the filament. Usually in such case the filaments are dipped and dried or partially dried a plurality of times.

What I claim is:

1. A mechanism for dip coating the filament and lead wires of a lamp stem comprising: a container for the coating material; means to rotate said container; a fixed plow member, having an aperture therein, extending into said coating material and maintained therein with its flat side disposed at an angle to the flow of the coating material and the aperture located therein extends in the direction of such flow whereby the coating material which is caused to flow through the aperture in said plow when the container is rotated is maintained at a predetermined constant level at the outlet of said aperture; and means to effect relative movement between the container of coating material and the lamp stem to bring a portion of the filament and lead wires of the lamp stem into wetting contact with the coating material as it flows out of the aperture in said plow.

2. A mechanism for dip coating the filament and lead wires of a lamp stem comprising: a plurality of containers for the coating material; means for maintaining one of said containers in working position; means through which a full container may be presented to said working position when the material in the active container becomes exhausted; means for rotating the container in working position; a fixed plow member, having an aperture therein, extending into said coating material and maintained therein with its flat side disposed at an angle to the flow of the coating material and the aperture located therein extends in the direction of such flow whereby the coating material which is caused to flow through the aperture in said plow when the container is rotated is maintained at a pre-determined constant level at the outlet of said aperture; and means to effect relative movement between the active container of coating material and the lamp stem to bring a portion of the filament and lead wires of the lamp stem into wetting contact with the coating material as its flows out of the aperture in said plow member.

3. A mechanism for dip coating the filament and lead wires of a lamp stem comprising: a cup having an annular groove to hold the coating material; means to rotate the cup; a fixed plow, having an aperture therein, extending into the coating material and maintained therein with its flat side disposed at an angle to the flow of the coating material and the aperture located therein extends in the direction of such flow whereby the coating material which is caused to flow through the aperture in said plow when the cup is rotated is maintained at a pre-determined constant level at the outlet of said aperture; and means to effect relative movement between the cup and the lamp stem to bring a portion of the filament and lead wires of the lamp stem into wetting contact with the coating material as it flows out of the aperture in said plow.

4. A mechanism for dip coating the filament and lead wires of a lamp stem comprising: a container for the coating material; means to rotate said container; a fixed plow member extending into said coating material, said fixed plow member having a substantially vertical bottom portion and another portion angularly disposed with respect to the flow of the coating material and having an aperture therein extending in the direction of said flow whereby the coating material which is caused to flow through the aperture in said plow when the container is rotated is maintained at a pre-determined constant level at the outlet of said aperture; and means to effect relative movement between the container of coating material and the lamp stem a predetermined amount to bring a portion of the filament and lead wires of the lamp stem into wetting contact with the coating material as it flows out of the aperture in said plow.

5. A mechanism for dip coating the filament and lead wires of a lamp stem comprising: a container for the coating material; means to rotate the container; a fixed plow member having an aperture therein, extending into said coating material and maintained therein with its flat side disposed at an angle to the flow of the coating material and the aperture therein extends in the direction of such flow whereby a jet of coating material is obtained at the outlet of said plow member upon rotation of the container; means to enclose the container to prevent evaporation of the material solvents, said means having a relatively small aperture therein above the outlet of said plow member and in register with the jet of coating material emanating therefrom; and means to effect relative movement between the container of coating material and the lamp stem to bring a portion of the filament and lead wires into said container through the aperture in said enclosure and into wetting contact with the jet of coating material emanating from the aperture in said plow member.

6. A mechanism for dip coating the filament and lead wires of lamp stems comprising the elements defined in claim 5 together with a turret for mounting a plurality of coating material containers and means through which a full container may be presented to its working position when the material in the active container becomes exhausted.

7. A mechanism for dip coating the filament and lead wires of lamp stems comprising: a frame; a plurality of rotatable containers for the coating material; a turret rotatably mounted on said frame rotatably supporting said containers; means to rotate the containers; a fixed plow member, having an aperture therein, extending into the coating material in each container and maintained therein with its flat side disposed at an angle to the flow of the coating material and the aperture therein extends in the direction of such flow whereby a jet of coating material is obtained at the outlet of said plow member upon rotation of the container; means to hold one container at its working position; means through which a full container may be presented to said working position when the material in the active container is consumed; and means to raise and lower said turret to bring the filament and lead wires of the lamp stem into wetting contact with the coating material as it flows out of the aperture in said plow member.

8. A mechanism for dip coating the filament and lead wires of a lamp stem comprising the elements defined in claim 7 together with means for enclosing the coating material containers, said enclosing means having a small opening therein, above the outlet of the plow member and in register with the jet of coating material emanating therefrom, through which the filament and lead wires pass to the coating material.

9. A mechanism for dip coating the filament and lead wires of a lamp stem having the elements defined in claim 7 together with a circular groove in each of said coating material containers, concentric with their axis of rotation, within which the coating material is received.

10. A mechanism for dip coating the filament and lead wires of a lamp stem comprising: a frame; a plurality of containers for the coating material; a turret rotatably mounted on said frame and upon which said containers are mounted; a latch plate on said turret for each container, each plate having a pin slot therein, one wall of which is higher than the other; a retractable slide mounted on said frame; and a latch pin in said slide in position to enter the slots in said latch plates.

GEORGE D. P. BRENT.

REFERENCES CITED

The following references are of record in the file of this patent:

UNITED STATES PATENTS

| Number | Name | Date |
|---|---|---|
| 2,159,091 | Kopitke | May 23, 1939 |
| 2,363,055 | Flaws | Nov. 21, 1944 |
| 2,431,135 | Morse | Nov. 18, 1947 |

FOREIGN PATENTS

| Number | Country | Date |
|---|---|---|
| 23,348 | Australia | Oct. 20, 1930 |